J. H. GEST.
Stalk-Chopper.
No. 9,463.
Patented Dec. 14, 1852.
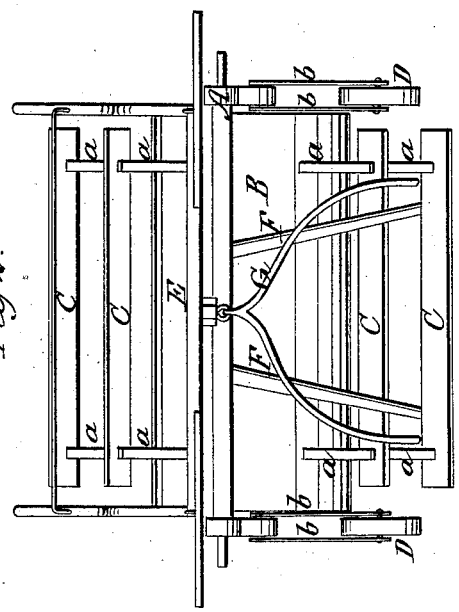
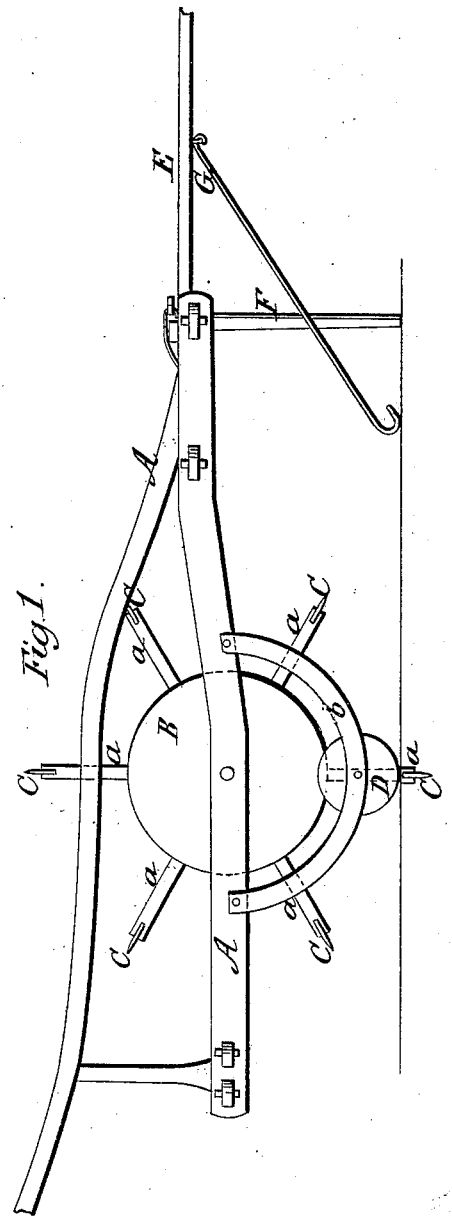

ated December 14, 1852.

UNITED STATES PATENT OFFICE.

JOSEPH H. GEST, OF BATAVIA, OHIO.

IMPROVEMENT IN FIELD-ROLLERS FOR CUTTING STALKS AND WEEDS.

Specification forming part of Letters Patent No. 9,463, dated December 14, 1852.

*To all whom it may concern:*

Be it known that I, J. H. GEST, of Batavia, in the county of Clermont and State of Ohio, have invented a certain new and useful Agricultural Implement for Cutting Stalks, Weeds, &c., from their roots while standing, and also cutting the stalks into small pieces when felled or lying on the ground, and which implement I term a "Stalk Roller and Cutter," or a "Cutting-Roller;" and I do hereby declare that the following is a full, clear, and exact description of the construction and operation of the same, reference being had to the annexed drawings, making a part of this specification, in which—

Figure 1 is a side elevation of the implement. Fig. 2 is a front view of the same.

Similar letters of reference indicate corresponding parts in each of the two figures.

The nature of my invention consists in the employment or use of a series of knives, either of straight or spiral form, said knives being placed upon a suitable roller and the roller placed within a proper a frame and attaching to the front part of the frame pins, which will be hereinafter described, the pins being for the purpose of bringing the stalks within the range of the knives. Forks attached to the tongue also effect the same purpose. The employment of the knife-roller in combination with the pins and forks constitutes the invention.

To enable others skilled in the art to make and use my invention, I will proceed to describe its construction and operation.

A represents the frame of the implement or machine. Said frame may be constructed of any proper material and of a convenient size and form.

B is a roller placed transversely in the frame, its journals working in bearings in the side pieces of the frame. In the periphery of the roller are placed arms a, which project some distance from the roller. Each arm has a groove in its end, and knives C fit in these grooves, bolts passing through the knives and the ends of the arms. The backs of the knives fit in the grooves, the edges projecting beyond the extreme ends of the arms. The arms a are arranged, as seen in Fig. 2, so that the knives are parallel with the axis of the roller; but the knives may be placed spirally on the roller, if desired. In this case the arms must be attached to the roller in position to suit the spiral form of the knives.

D D are rollers, the axes of which are hung in semicircular braces b b, attached to the side pieces of the frame and projecting downward. The rollers rest upon the ground, and are of essential use, for they prevent the knives sinking too deep in the earth. These rollers may be elevated or depressed, so as to cause the knives to penetrate the required distance below the surface of the ground. All that is required to effect this is to have the semicircular braces perforated with a series of holes, so that the journals of the roller may be placed past the center of the braces or at the center. Of course when the journals are in the center holes the knives will not penetrate so deep into the earth as when the journals fit past the center. There are other ways, however, of adjusting the rollers, which would answer equally well.

E is the tongue attached to the frame, having the usual whiffletree attached, to which the traces are secured.

F F are pins attached to the front crosspiece of the frame and projecting downward. These pins are for the purpose of drawing the stalks within the range of the cutters as the machine or implement moves along.

G is a fork attached to the tongue. The ends of the prongs of the fork rest upon the ground, and are curved or bent in the form of a hook. (See Fig. 1.) These prongs effect the same object as the pins—viz, they draw the stalks within the range of the knives.

The operation will be readily seen. As the machine is drawn along the roller B revolves and the knives C on the roller cut the stalks from the roots, and also cut the stalks in pieces as they lie upon the ground, the pins F F and the prongs of the fork G drawing the stalks in front of the machine within the range of the knives.

This implement or machine will be a valuable acquisition to agriculturists. Stalks are cut by it from the roots, and also cut into small pieces while lying. It may also be used advantageously in other cases, such as the cutting of weeds on fields where they have sprung up before the seed that was planted. In the latter case the seed would be uninjured by operating with the above machine.

Having thus described the nature and operation of my invention, what I claim as new, and desire to secure by Letters Patent, is—

The employment or use of the knife-roller, said knives being either of straight or spiral form, in combination with the pins F F and fork G, the knives as the machine moves along cutting the stalks from the roots, and also the stalks into pieces while lying upon the ground, and the pins and prongs of the forks drawing the stalks within range of the knives, as herein specified.

JOSEPH H. GEST.

Witnesses:
M. JAMIESON,
JAMES PERVINE.